(12) United States Patent
Reger et al.

(10) Patent No.: US 9,836,345 B2
(45) Date of Patent: Dec. 5, 2017

(54) FORENSICS COLLECTION FOR FAILED STORAGE CONTROLLERS

(71) Applicant: NetApp Inc., Sunnyvale, CA (US)

(72) Inventors: Brad A. Reger, Dublin, CA (US); Curtis Anderson, Saratoga, CA (US); Pradeep K. Kalra, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 192 days.

(21) Appl. No.: 14/695,145

(22) Filed: Apr. 24, 2015

(65) Prior Publication Data

US 2016/0110240 A1   Apr. 21, 2016

Related U.S. Application Data

(60) Provisional application No. 62/065,134, filed on Oct. 17, 2014.

(51) Int. Cl.
| | |
|---|---|
| *G06F 11/00* | (2006.01) |
| *G06F 11/07* | (2006.01) |
| *G06F 17/30* | (2006.01) |
| *G06F 11/30* | (2006.01) |
| *G06F 11/34* | (2006.01) |

(52) U.S. Cl.
CPC ........ *G06F 11/079* (2013.01); *G06F 11/0727* (2013.01); *G06F 11/0751* (2013.01); *G06F 11/0778* (2013.01); *G06F 11/0784* (2013.01); *G06F 17/30598* (2013.01); *G06F 11/3041* (2013.01); *G06F 11/3055* (2013.01); *G06F 11/3409* (2013.01)

(58) Field of Classification Search
USPC .......................................... 714/37
See application file for complete search history.

(56) References Cited

U.S. PATENT DOCUMENTS

| | | | | |
|---|---|---|---|---|
| 8,296,600 | B2* | 10/2012 | He | H04L 41/0668 714/13 |
| 2009/0083423 | A1* | 3/2009 | Basham | G06F 3/0605 709/226 |
| 2011/0283149 | A1* | 11/2011 | Richmond | G06F 11/0709 714/39 |
| 2013/0246857 | A1* | 9/2013 | Minamiura | G06F 11/26 714/42 |

(Continued)

*Primary Examiner* — Sarai Butler
(74) *Attorney, Agent, or Firm* — Cooper Legal Group, LLC

(57) ABSTRACT

One or more techniques and/or systems are provided for collecting forensics associated with a failure of a storage controller. For example, a storage node, of a cluster environment, may comprise a service processor and a storage controller. The storage controller may manage a storage device accessible, through the storage controller, to one or more client devices. The service processor may manage the storage controller (e.g., collect operational statistics of the storage controller, perform software and/or firmware updates for the storage controller, etc.). The service processor may obtain forensics associated with a failure of the storage controller, and may provide the forensics to a cluster health monitor notwithstanding the storage controller being in an inoperable state (e.g., the service processor may send the forensics through a network interface controller of the storage node, over a non-client storage management network, to the cluster health monitor).

20 Claims, 13 Drawing Sheets

(56) References Cited

U.S. PATENT DOCUMENTS

| | | | |
|---|---|---|---|
| 2013/0339544 A1* | 12/2013 | Mithyantha | H04L 45/02 709/238 |
| 2015/0081893 A1* | 3/2015 | Chadwell | G06F 3/0659 709/224 |
| 2015/0169411 A1* | 6/2015 | Kalman | G06F 11/2023 714/4.12 |
| 2015/0331768 A1* | 11/2015 | Chadha | G06F 11/2028 714/6.3 |

* cited by examiner

FORENSICS COLLECTION FOR FAILED STORAGE CONTROLLERS

RELATED APPLICATION

This application is a non-provisional filing of and claims priority to U.S. Provisional Application No. 62/065,134, titled "FORENSICS COLLECTION FOR FAILED STORAGE CONTROLLERS" and filed on Oct. 17, 2014, which is incorporated herein by reference.

BACKGROUND

A cluster environment may comprise a plurality of storage nodes that may communicate over a cluster network. A storage node may comprise a storage controller configured to provide client devices with access to one or more storage devices (e.g., read and/or write access to data stored on a storage device connected to a storage node and managed by the storage controller). The storage node may comprise a service processor that may be associated with (e.g., connected to) the storage controller. The service processor may operate independent of the storage controller so that a failure of the storage controller may not result in a direct operational failure of the service processor. However, the service processor may lose network access during the failure because communication to and from the service processor may have been provided through the storage controller. The service processor may be configured to monitor the operation and health of the storage controller. For example, the service processor may collect performance statistics of the storage controller, implement firmware updates for the storage controller, implement software updates for the storage controller, and/or communicate with cluster network administrative entities.

When a failure of the storage controller occurs, an administrator of the cluster network may desire to obtain forensics about why the storage controller failed before bringing the storage controller back online. Unfortunately, such information may be unavailable from the service processor during the failure because communication to the service processor may be unavailable since such communication is routed through the storage controller. Thus, remote access to the service processor for obtaining forensics about the failure may be unavailable.

DETAILED DESCRIPTION

Figure 1:
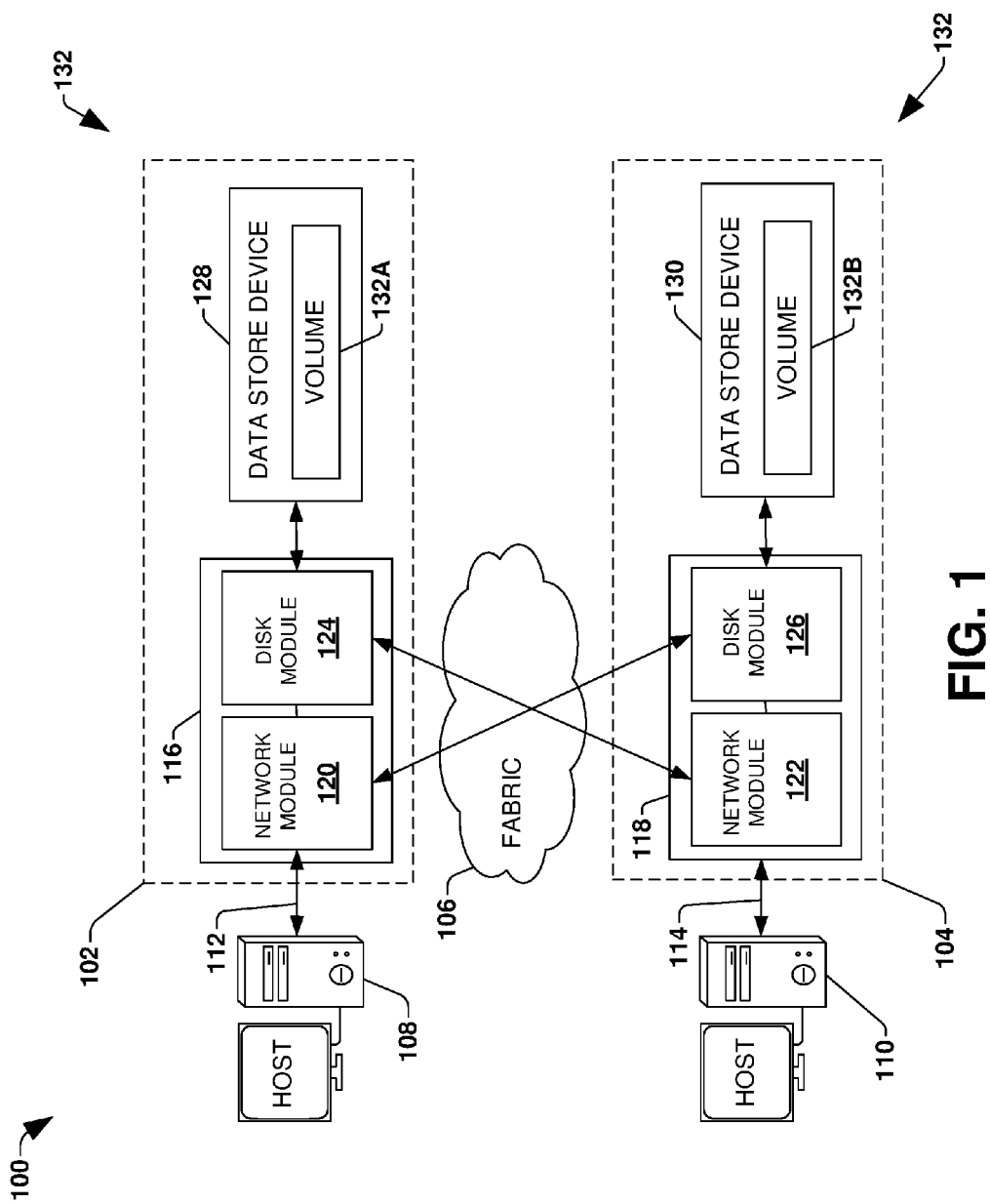
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for collecting forensics associated with a failure of a storage controller are provided. A cluster environment may comprise a plurality of storage nodes, such as a first storage node. The first storage node may comprise a first storage controller configured to manage a storage device accessible to one or more clients. The first storage node may comprise a first service processor. In an example, the first service processor may have an association with the first storage controller (e.g., the first service processor may manage the first storage controller, such as by collecting health statistics, implementing updates, changing configuration, implementing polices, etc.). The first service processor may be configured to detect a failure of the first storage controller. The first service processor may obtain forensics associated with the failure. The first service processor may expose the forensics to a cluster health monitor, such as during the failure. For example, the first service processor may be connected (e.g., using a relatively low cost Network Controller Sideband Interface (NC-SI)) to a network interface controller (NIC) connected to a network (e.g., a relatively high speed non-client storage management network used for the management of storage nodes, which may be private from a relatively lower speed client network over which client devices connect to the storage nodes for data storage). In this way, the cluster health monitor (e.g., located at a remote source with respect to the first storage node) may obtain the forensics for evaluation to determine a recommendation (e.g., take no action, reboot the first storage controller, perform a software or firmware update for the first storage controller, modify a resource allocation to the first storage controller, modify a policy for the first storage controller, send an alert, etc.).

To provide context for collecting forensics associated with a failure of a storage controller, FIG. 1 illustrates an embodiment of a clustered network environment or a network storage environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a disk module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the disk module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the disk module 126, thereby accessing volume 132B associated with the data storage device 130.

It may be appreciated that collecting forensics may be implemented within the clustered network environment 100. For example, a service processor may be implemented for the node 116 and/or the node 118. The service processor may be configured to collect forensics associated with a failed storage controller that is associated with the node 116 and/or the node 118. The service processor may communicate the forensics to a cluster health monitor located within the clustered network environment 100 (e.g., the forensics may be communicated over the cluster fabric 106).

Figure 2:
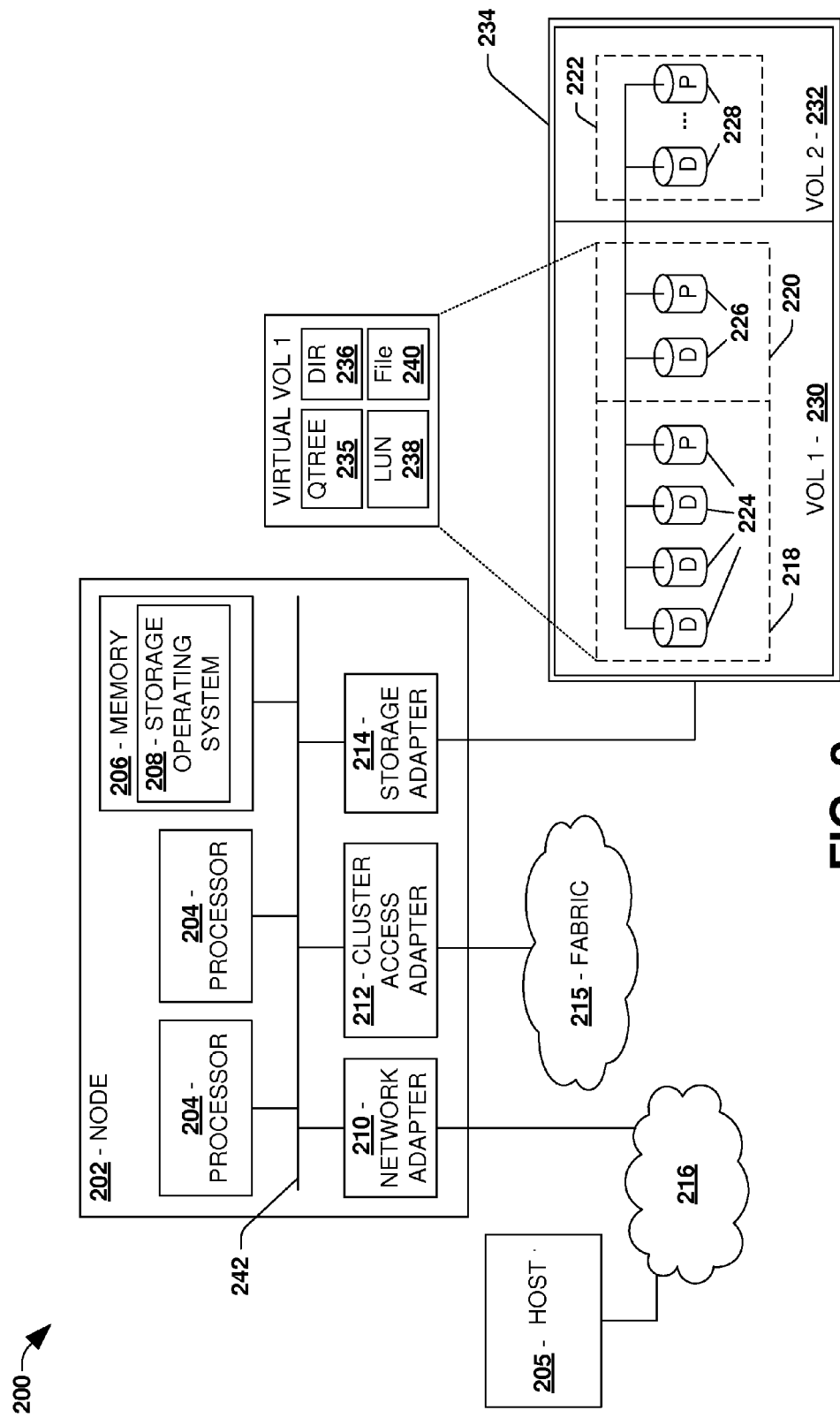
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that collecting forensics may be implemented for the data storage system 200. For example, a service processor may be implemented for the node 202. The service processor may be configured to collect forensics associated with a failed storage controller that is associated with the node 202. The service processor may communicate, over the network 216 and/or the cluster fabric 215, the forensics to a cluster health monitor.

Figure 3A:
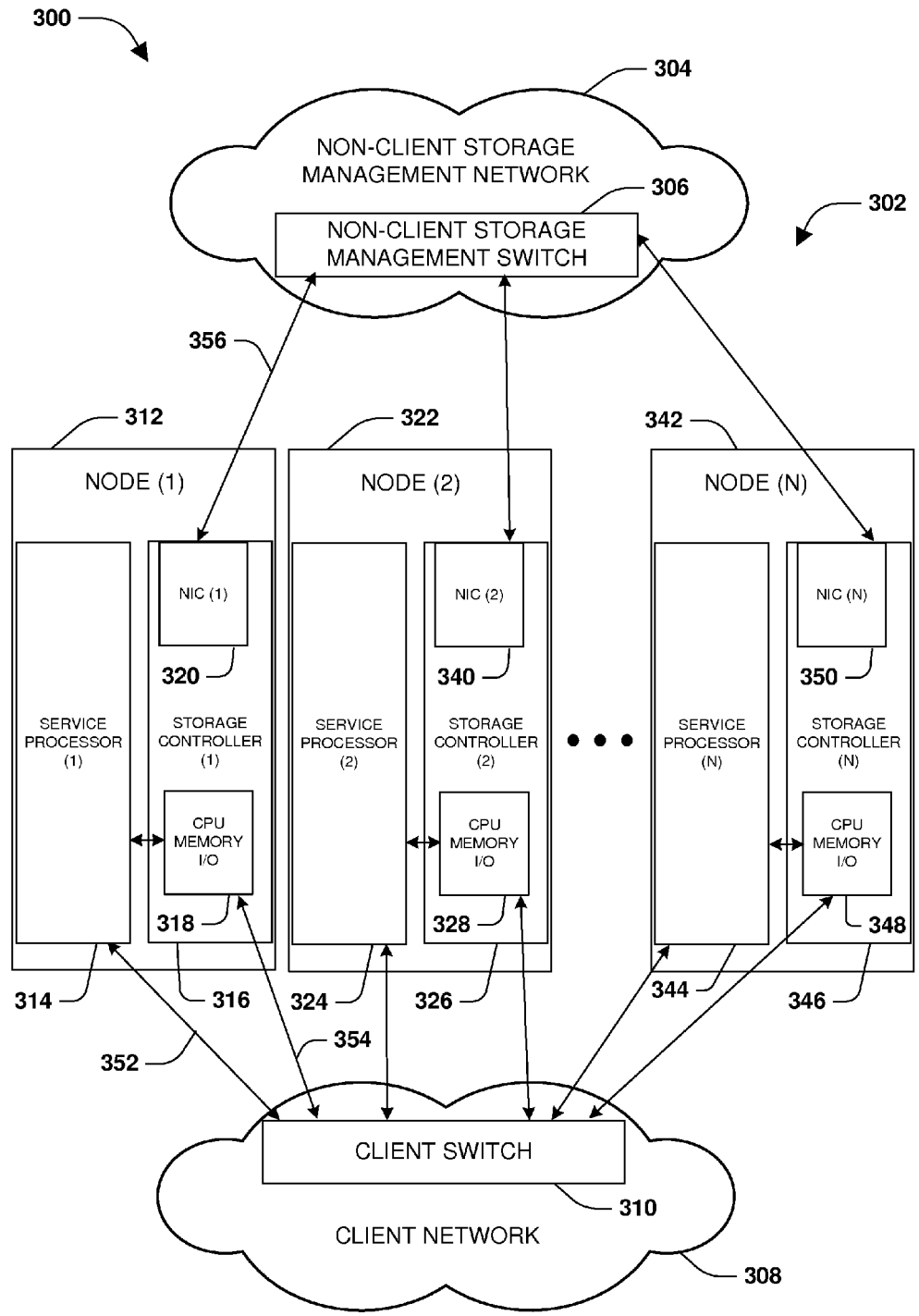
FIG. 3A is a component block diagram illustrating an exemplary system for collecting forensics associated with a failure of a storage controller, where service processors are configured according to a first communication configuration.

FIGS. 3A-3D illustrate examples of communication configurations for service processors configured to collect forensics associated with failed storage controllers of a cluster environment 302. FIG. 3A illustrates an example of a first communication configuration 300 for one or more service processors of the cluster environment 302. The cluster environment 302 may comprise a client network 308 connecting, such as by a client switch 310, one or more client devices (not illustrated) to a plurality of storage nodes, such as a first storage node 312, a second storage node 322, a storage node (N) 342, etc. The storage nodes may comprise storage controllers, such as a first storage controller 316 of the first storage node 312, a second storage controller 326 of the second storage node 322, and a storage controller (N) 346 of the storage node (N) 342, configured to manage storage devices accessible to the one or more client devices over the client work 308. The first storage controller 316 may comprise first processing resources 318 (e.g., CPU, memory, I/O functionality, etc.), the second storage controller 326 may comprise second processing resources 328, the storage controller (N) 346 may comprise processing resources (N) 348, etc. The storage controllers may be connected to the client network 308 by connections to the client switch 310, such as the first storage controller 316 being connected to the client network 308 by a first client network connection 354 to the client switch 310.

The storage nodes may be configured to communicate with one another and/or other devices (e.g., a storage management administrative device, a storage device, etc.) over a non-client storage management network 304 (e.g., cluster fabric 106 of FIG. 1 and/or cluster fabric 215 of FIG. 2), such as for storage management purposes (e.g., synchronize two storage nodes, retrieve data from a remote storage device, perform a policy update for a storage controller, perform a software update for a storage controller, etc.). The first storage controller 316 may connect to a non-client storage management switch 306 (e.g., a relatively higher speed private switch not connected to the client network 308) through a first network interface controller (NIC) 320 (e.g., cluster access adapter 212) over a first non-client storage management connection 356. The second storage controller 326 may connect to the non-client storage management switch 306 through a second NIC 340. The storage controller (N) 346 may connect to the non-client storage management switch 306 through a NIC (N) 350.

The first storage node 312 may comprise a first service processor 314 associated with the first storage controller 316. The first service processor 314 may be configured to manage the first storage controller 316 (e.g., perform updates, implement policies, collect operational statistics, update configuration, collect forensics, etc.). The second storage node 322 may comprise a second service processor 324 associated with the second storage controller 326. The second service processor 324 may be configured to manage the second storage controller 326 (e.g., perform updates, implement policies, collect operational statistics, update configuration, collect forensics, etc.). The storage node (N) 342 may comprise a service processor (N) 344 associated with the storage controller (N) 346. The service processor (N) 344 may be configured to manage the storage controller (N) 346 (e.g., perform updates, implement policies, collect operational statistics, update configuration, collect forensics, etc.).

In an example, a service processor may have a one-to-one relationship with a storage controller. In an example, a service processor may have a one-to-many relationship with storage controllers (e.g., the service processor may comprise a chassis manager having a first relationship with the third storage controller and a second relationship with the fourth storage controller). In an example, the first storage controller 316 and the second storage controller 326 may be configured according to a node pairing (e.g., a high availability (HA) pairing) where the first storage controller 316 is configured as a primary storage controller that provides client devices with access to a storage device and the second storage controller 326 is configured as a secondary storage controller configured to provide failover operation when the first storage controller 316 fails.

A service processor may be configured to detect a failure of a storage controller. During the failure, the service processor may collect forensics associated with the failure. For example, the forensics may comprise system log data of the failed storage controller, a service processor event log of the service processor, a current sensor value (e.g., values from one or more sensors, such as a current sensor, a temperature sensor, a voltage sensor, and/or other sensors that may measure hardware environment information-), a hardware signal state (e.g., a state of a storage device connected to the storage controller), an operating system cookie of an operating system for a storage node, a service processor induced dump of CPU registers, system memory data, an operating system core dump, peripheral component interconnect information, etc.

In an example, the first service processor 314 may obtain forensics associated with a failure of the first storage controller 316. The first service processor 314 may expose the forensics to a cluster health monitor (e.g., while the first storage controller 316 is in an inoperable state due to the failure, which may provide for an evaluation of the forensics to create a recommendation as to whether to bring the first storage controller 316 back online or not). In an example, the cluster heath monitor may be located on the first storage node 312. In an example, the cluster health monitor may be located remote from the first storage node 312, such as at another storage node or other device (e.g., connected to the non-client storage management network 304 and/or the client network 308). FIG. 3A illustrates the first communication configuration 300 where the first service processor 314 is connected to the client network 308 by a first service processor client network connection 352 to the client switch 310 (e.g., which may use additional cables, client switch ports, client address management, and/or client network bandwidth). The first service processor 314 may send the forensics to the cluster health monitor over the client network 308 using the first service processor client network connection 352.

Figure 3B:
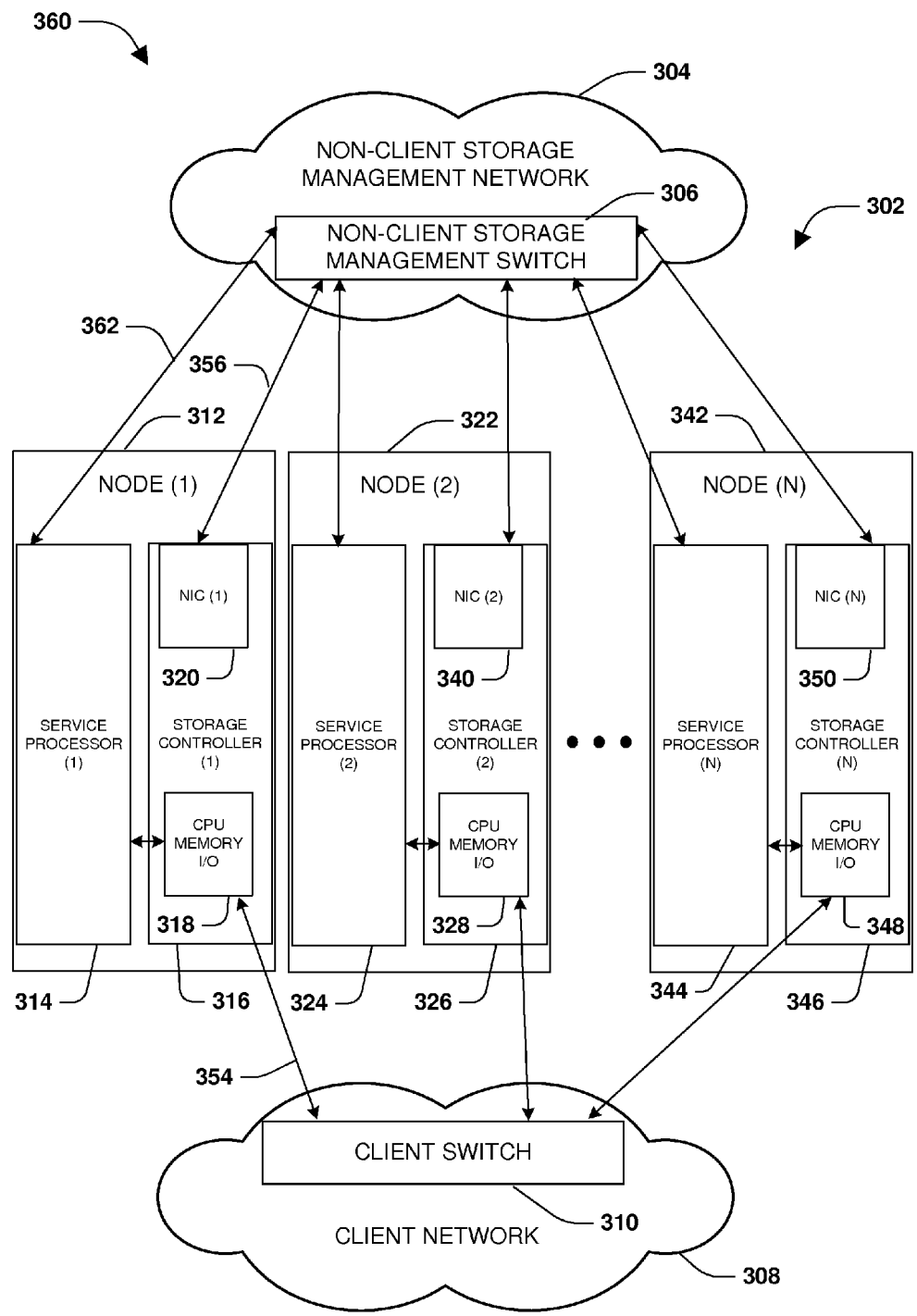
FIG. 3B is a component block diagram illustrating an exemplary system for collecting forensics associated with a failure of a storage controller, where service processors are configured according to a second communication configuration.

FIG. 3B illustrates an example of a second communication configuration 360 where the first service processor 314 is connected to the non-client storage management network 304 by a first service processor non-client storage management connection 362 that is connected to the non-client storage management switch 306 (e.g., which may use costly and/or complex service processor infrastructure to connect to the relatively faster (e.g., high-speed) non-client storage management network 304). The first service processor 314 may send the forensics to the cluster health monitor over the non-client storage management network 304 using the first service processor non-client storage management connection 362.

Figure 3C:
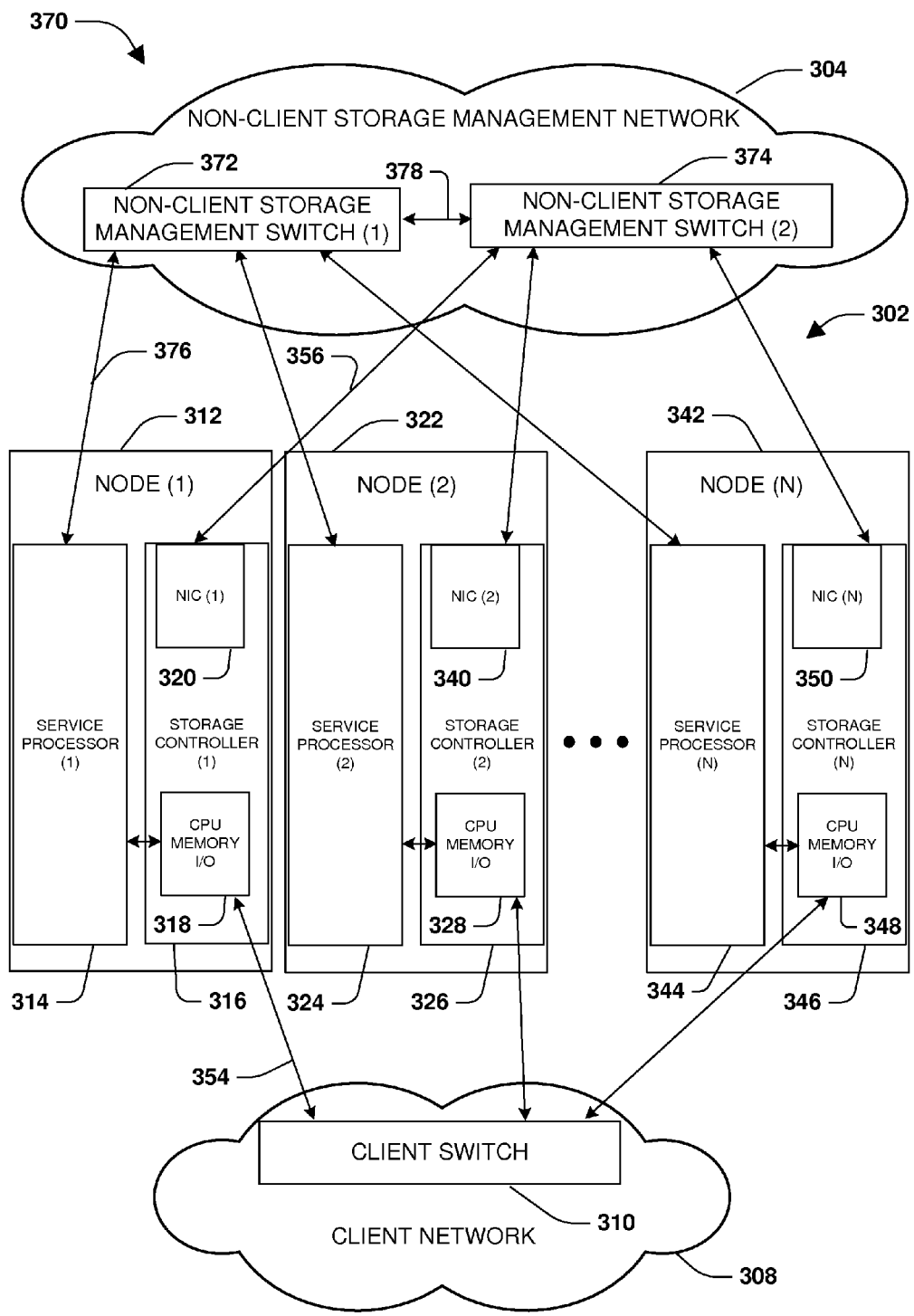
FIG. 3C is a component block diagram illustrating an exemplary system for collecting forensics associated with a failure of a storage controller, where service processors are configured according to a third communication configuration.

FIG. 3C illustrates an example of a third communication configuration 370 where the first service processor 314 is connected to the non-client storage management network 304 through a first non-client storage management switch 372 (e.g., a relatively lower speed private switch not connected to the client network 308) connected to a second non-client storage management switch 374 (e.g., a relatively higher speed private switch not connected to the client network 308, but connected to the non-client storage management network 304) of the non-client storage management network 304. The first service processor 314 is connected to the first non-client storage management switch 372 by a first connection 376 (e.g., a relatively lower speed and/or less expensive connection to mitigate connectivity equipment costs between service processors and the first non-client storage management switch 372), and the first non-client storage management switch 372 is connected to the second non-client storage management switch 374 by a second connection 378 (e.g., a relatively higher speed and/or more expensive connection). Using the first non-client storage management switch 372 and the second non-client storage management switch 374 to send forensics over the non-client storage management network 304, as opposed to sending forensics the client network 308, may mitigate client network bandwidth utilization of the client network 308 because the first service processor 314 is not sending the forensics over the client network 308. The first service processor 314 may send the forensics to the cluster health monitor over the non-client storage management network 304 using the first connection 376 to the first non-client storage management switch 372 and the second connection 378 to the second non-client storage management switch 374.

Figure 3D:
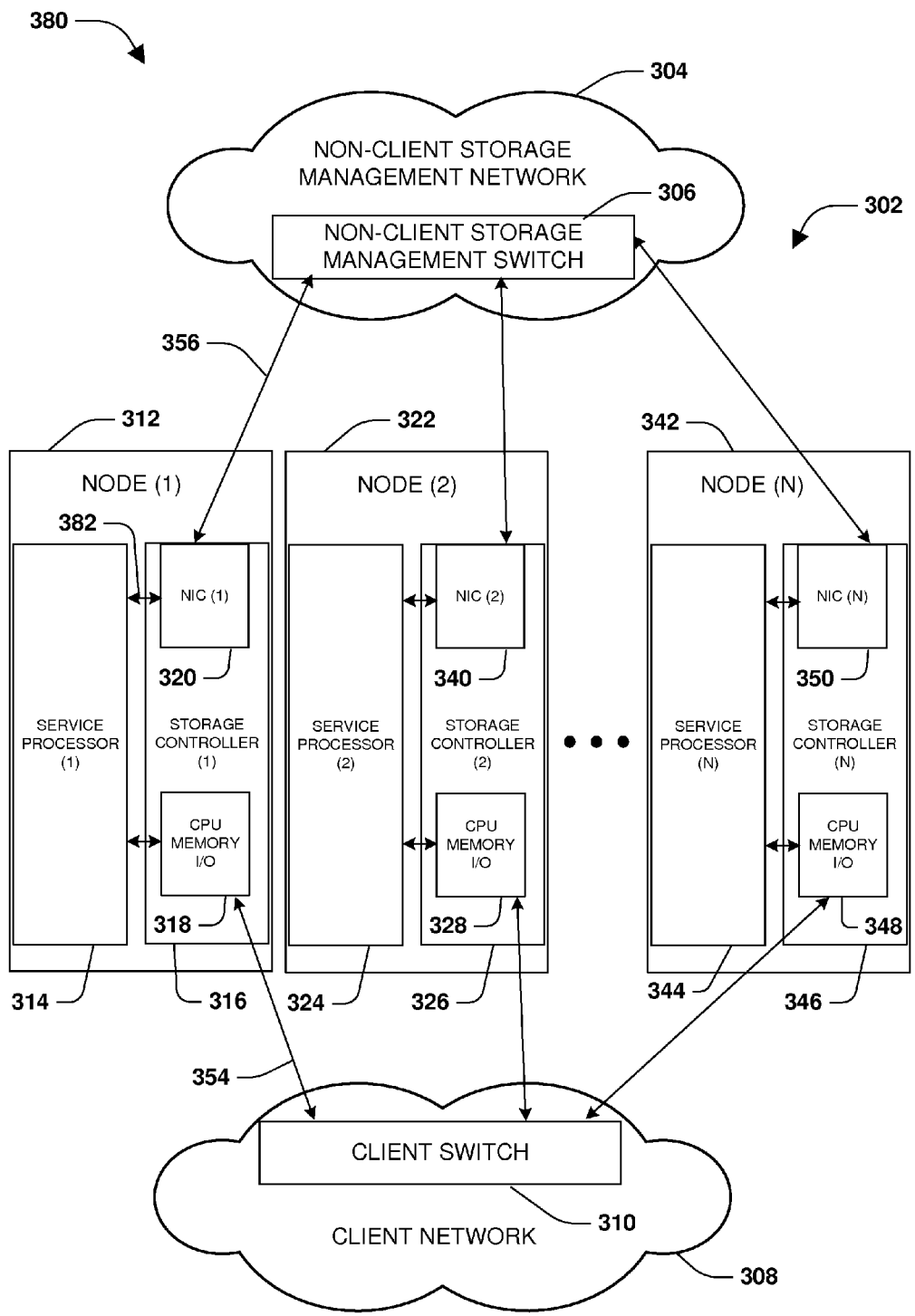
FIG. 3D is a component block diagram illustrating an exemplary system for collecting forensics associated with a failure of a storage controller, where service processors are configured according to a fourth communication configuration.

FIG. 3D illustrates an example of a fourth communication configuration 380 where the first service processor 314 is connected to the non-client storage management network 304 through a connection 382 to the first NIC 320 of the first storage node 312 (e.g., a relatively low cost Network Controller Sideband Interface to the relatively higher speed first NIC 320, such as by a wire on an integrated circuit board, which may mitigate costs and/or overhead associated with using additional cables, switch ports, and/or client network bandwidth). The first NIC 320 is connected by the first non-client storage management connection 356 to the non-client storage management switch 306 of the non-client storage management network 304 so that the service processor 314 may communicate over the non-client storage management network 304 to a cluster health monitor. Because the first NIC 320 may be operational when the first storage controller 316 fails, the service processor 314 may retain communication capabilities through the first NIC 320 to the non-client storage management network 304, such as for the purpose of sending forensics to a remote destination such as the cluster health monitor. The first service processor 314 may send the forensics to the cluster health monitor over the non-client storage management network 304 using the connection 382 to the first NIC 320 and the first non-client storage management connection 356 to the non-client storage management switch 306.

Figure 4:
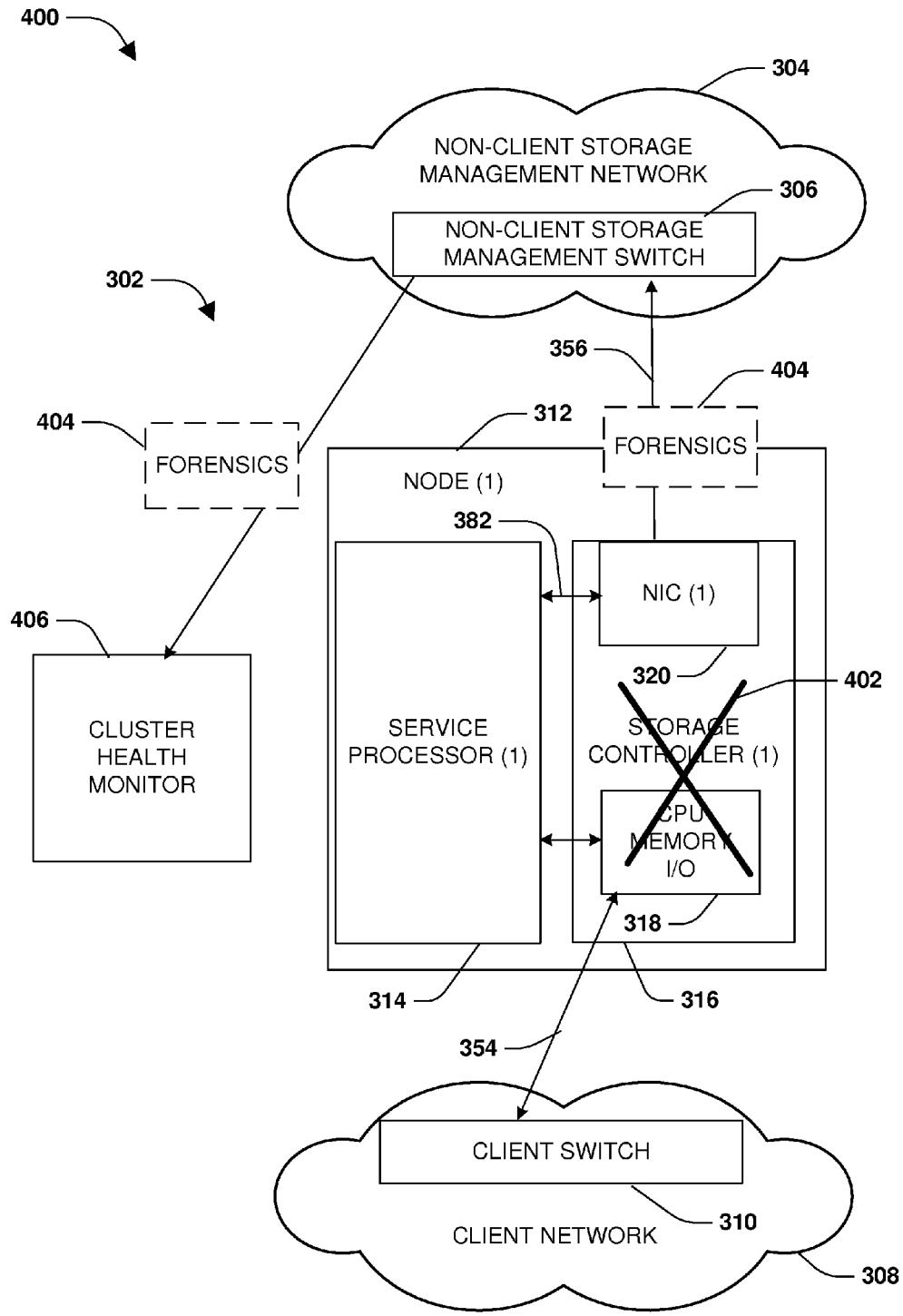
FIG. 4 is a component block diagram illustrating an exemplary system for collecting forensics associated with a failure of a storage controller, where forensics are sent to a cluster health monitor.

FIG. 4 illustrates an example of a system 400 for collecting forensics associated with a failure of a storage controller, such as the first service processor 314 detecting a failure 402 of the first storage controller 316. The first service processor 314 may collect forensics 404, such as system log data of the first storage controller 316, a service processor event log of the first service processor 314, a current sensor value (e.g., values from one or more sensors, such as a current sensor, a temperature sensor, a voltage sensor, and/or other sensors that may measure hardware environment information associated with the first storage controller 316), a hardware signal state (e.g., a state of a storage device connected to the first storage controller 316), an operating system cookie of an operating system for a first storage node 312, a service processor induced dump of CPU registers, system memory data, an operating system core dump, peripheral component interconnect information, etc.

In an example, the first service processor 314 may obtain and/or expose the forensics 404 to a cluster health monitor 406 while the first storage controller 316 is inoperable due to the failure 402 because the first NIC 320 may still be operational notwithstanding the failure 402 of the first storage controller 316. The forensics 404 may be sent over the connection 382 to the first NIC 320 and over the first non-client storage management connection 356 to the non-client storage management switch 306. The forensics 404 may be sent from the non-client storage management switch 306 over the non-client storage management network 304 to the cluster health monitor 406. In an example of exposing the forensics 404, the first service processor 314 may have received a forensics pull request from the cluster health monitor 406, and the first service processor 314 may provide the cluster health monitor 406 with access to the forensics 404 based upon the forensics pull request. In an example of exposing the forensics 404, the first service processor 314 may push the forensics 404 to the cluster health monitor 406 based upon a push policy specifying that the cluster health monitor 406 is to be notified with forensics data for failures associated with the first storage controller 316.

Figure 5A:
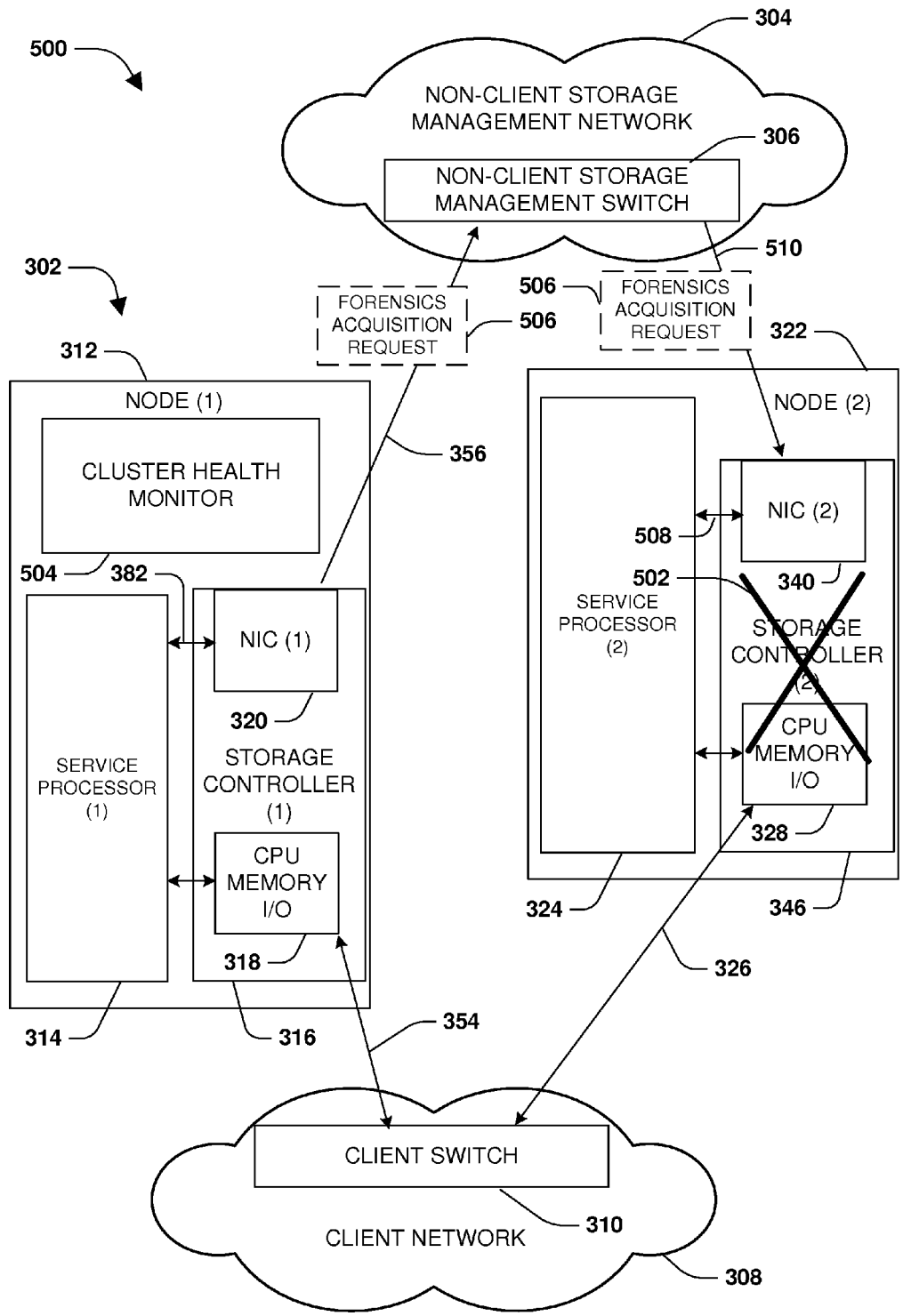
FIG. 5A is a component block diagram illustrating an exemplary system for collecting forensics associated with a failure of a storage controller, where a forensics acquisition request is sent to a second service processor.
Figure 5B:
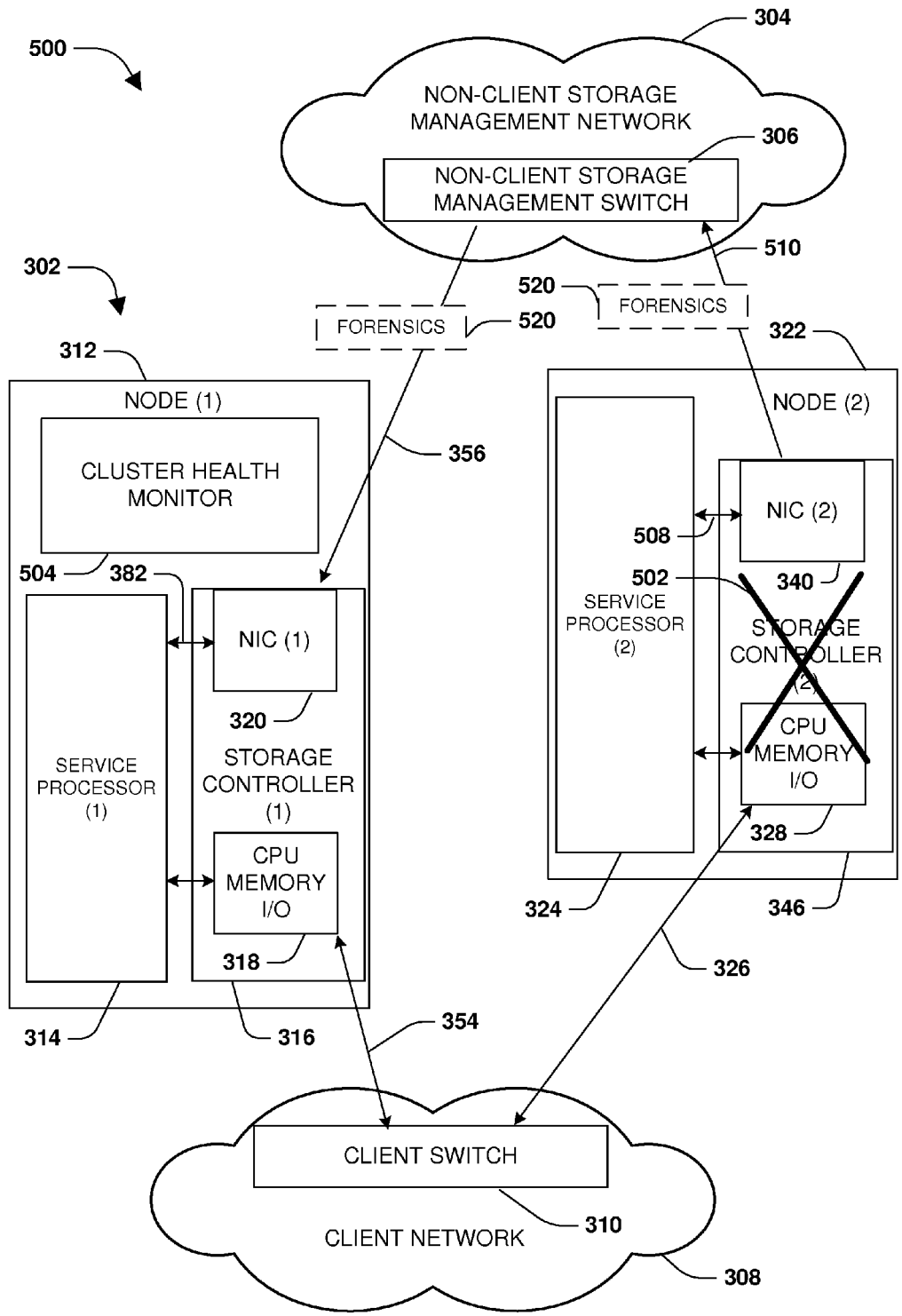
FIG. 5B is a component block diagram illustrating an exemplary system for collecting forensics associated with a failure of a storage controller, where forensics are sent to a cluster health monitor.
Figure 5C:
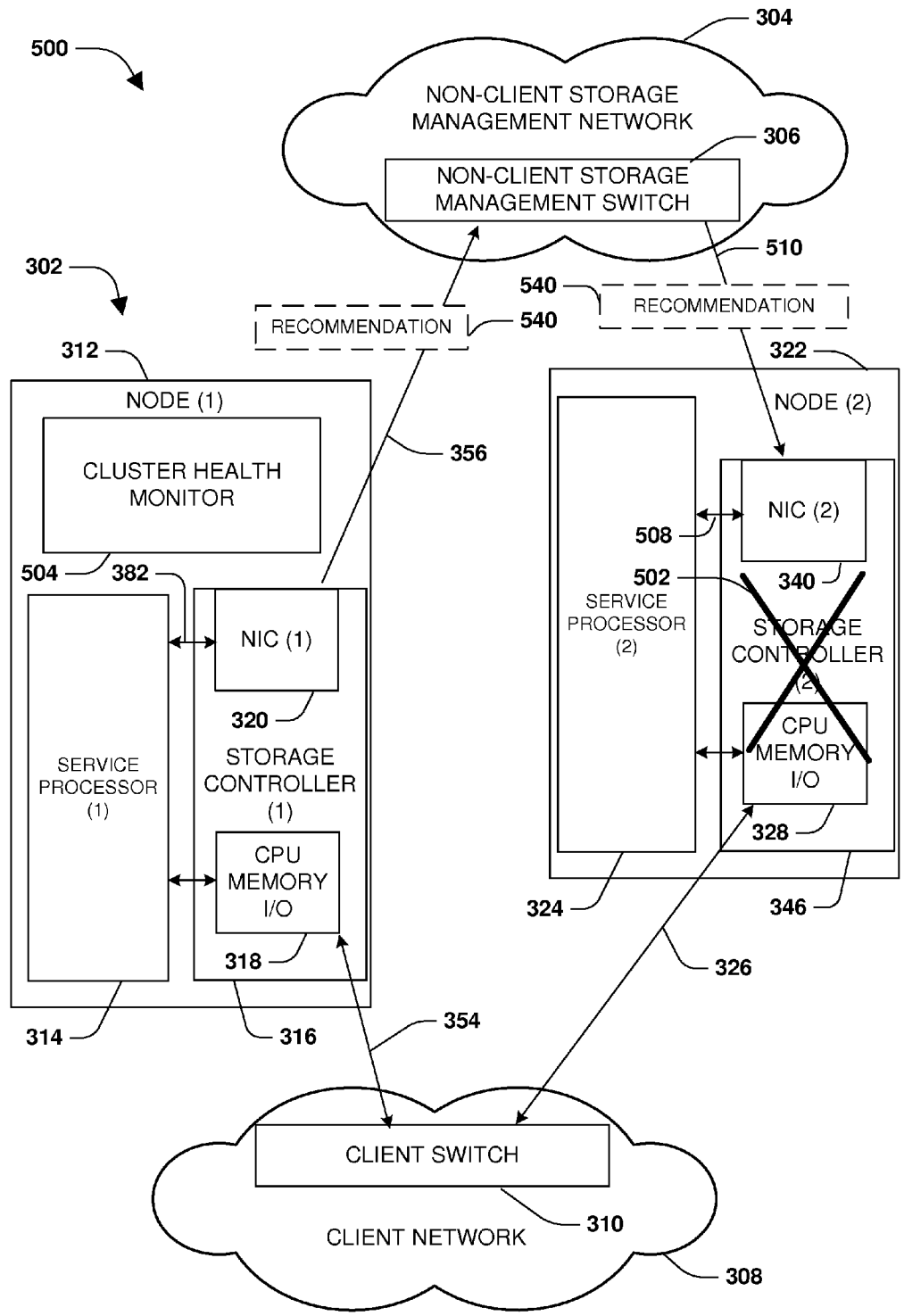
FIG. 5C is a component block diagram illustrating an exemplary system for collecting forensics associated with a failure of a storage controller, where a recommendation is sent to a second service processor.

FIGS. 5A-5C illustrate examples of a system 500 for collecting forensics associated with a failure of a storage controller, such as the first storage node 312 (e.g., the cluster health monitor 504) invoking the second service processor 324 to collect forensics 520 associated with a failure 502 of the second storage controller 346. FIG. 5A illustrates a cluster health monitor 504 located on the first storage node 312. The failure 502 of the second storage controller 346, comprised within the second storage node 322, may be detected (e.g., a local service processor, such as the second service processor 324, may detect the failure 502 utilizing various hardware sensors, software sensors, communication sensors, etc.; a monitoring component, hosted on a remote storage node that is separate from the second storage node 322, may detect the failure 502 utilizing various mechanisms such as a loss of a heartbeat). For example, the first storage node 312 (e.g., the cluster health monitor 504) may detect the failure 502 of the second storage controller 346. The first storage node 312 (e.g., the cluster health monitor 504) may send a forensics acquisition request 506 to the second service processor 324 on the second storage node 322. For example, the forensics acquisition request 506 may be sent over the first non-client storage management connection 356 to the non-client storage management switch 306. The forensics acquisition request 506 may be sent from the non-client storage management switch 306, through the non-client storage management network 304, and over a second non-client storage management connection 510 to the second NIC 340. The forensics acquisition request 506 may be sent from the NIC 340, over a connection 508, to the second service processor 324.

The forensic acquisition request 506 may instruct the second service processor 324 to collect the forensics 520 associated with the failure 502 of the second storage controller 346. FIG. 5B illustrates the second service processor 324 collecting the forensics 520, and sending the forensics 520 to the first storage node 312 (e.g., to the cluster health monitor 504). For example, the forensics 502 may be sent over the non-client storage management network 304 to the first NIC 320 of the first storage node 312, which may expose the forensics 520 to the first storage node 312 (e.g., the cluster health monitor 504). The forensics 520 may be evaluated to create a recommendation 540 (e.g., the first storage node 312, such as the cluster health monitor 504, may create the recommendation 540) that may be sent over the non-client storage management network 304 to the second service processor 324. The recommendation 540 may comprise a take no action instruction, a power-cycle instruction to apply to the second storage controller 346, reboot instruction to apply to the second storage controller 346, a software update for the second storage controller 346, a firmware update for the second storage controller 346, a configuration state update for the second storage controller 346, a policy modification instruction, a resource allocation modification for the second storage controller 346, a send alert instruction, etc. The second service processor 324 may implement the recommendation 540.

Figure 6:
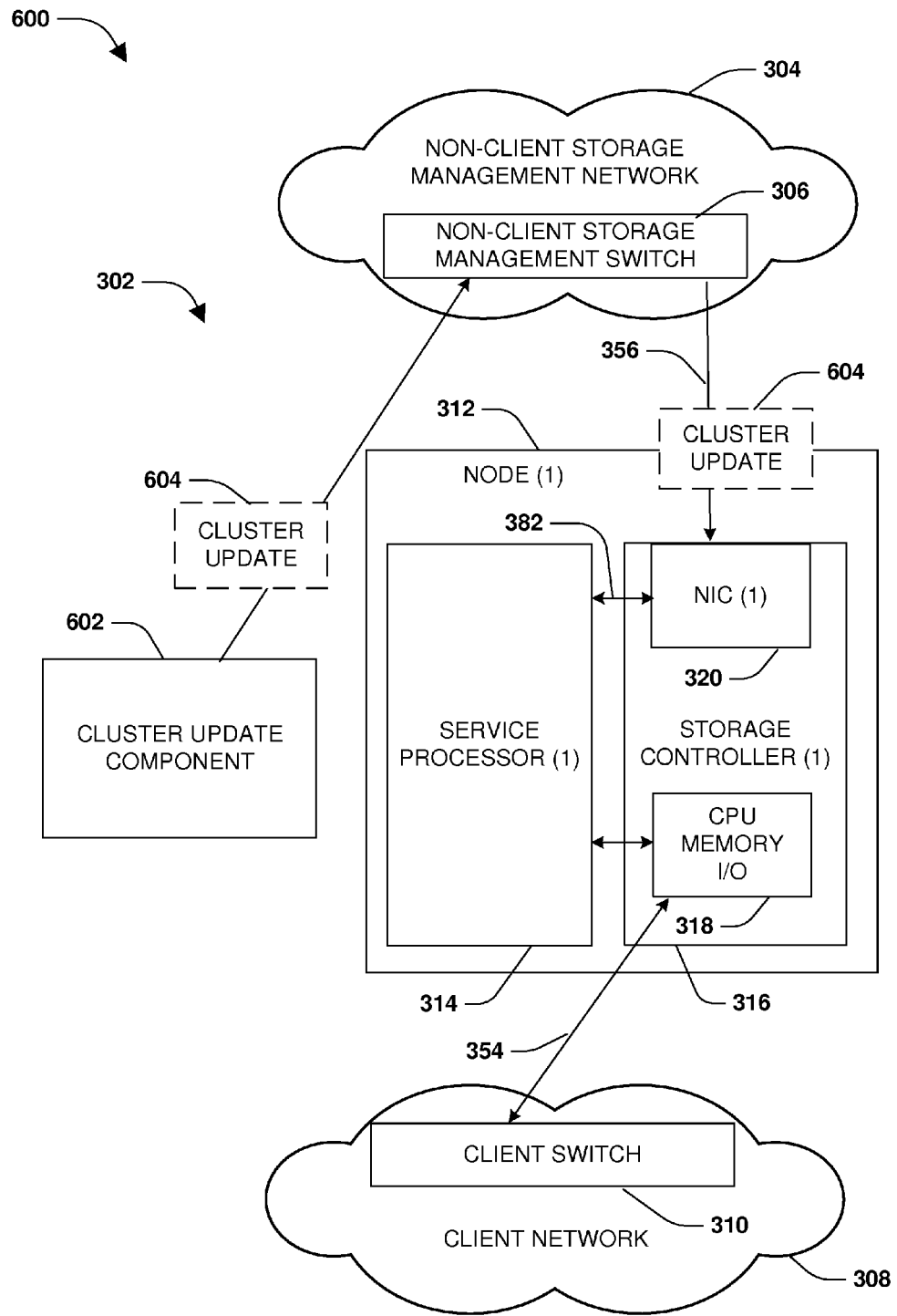
FIG. 6 is a component block diagram illustrating an exemplary system for updating a service processor.

FIG. 6 illustrates an example of a system 600 associated with a cluster update component 602 that provides a cluster update 604 to the first service processor 314. The cluster update may comprise an issue detection instruction for the first service processor 314 to investigate (e.g., obtain forensics relating to a failure, a potential failure, performance below an expectation level, etc.), a firmware update for the first storage controller 316, a configuration update for the first storage controller 316, a software update for the first storage controller 316, and/or a variety of other information. In an example, the cluster update 604 may correspond to a cluster update push that is pushed from the cluster update component 602, through the non-client storage management network 304, to the first service processor 314. In another example, the cluster update 604 may be provided from the cluster update component 602, through the non-client storage management network 304, to the first service processor 314 based upon a cluster update pull request sent from the first service processor 314 to the cluster update component 602. In this way, the first service processor may implement the cluster update 604 for the first storage controller 316.

Figure 7:
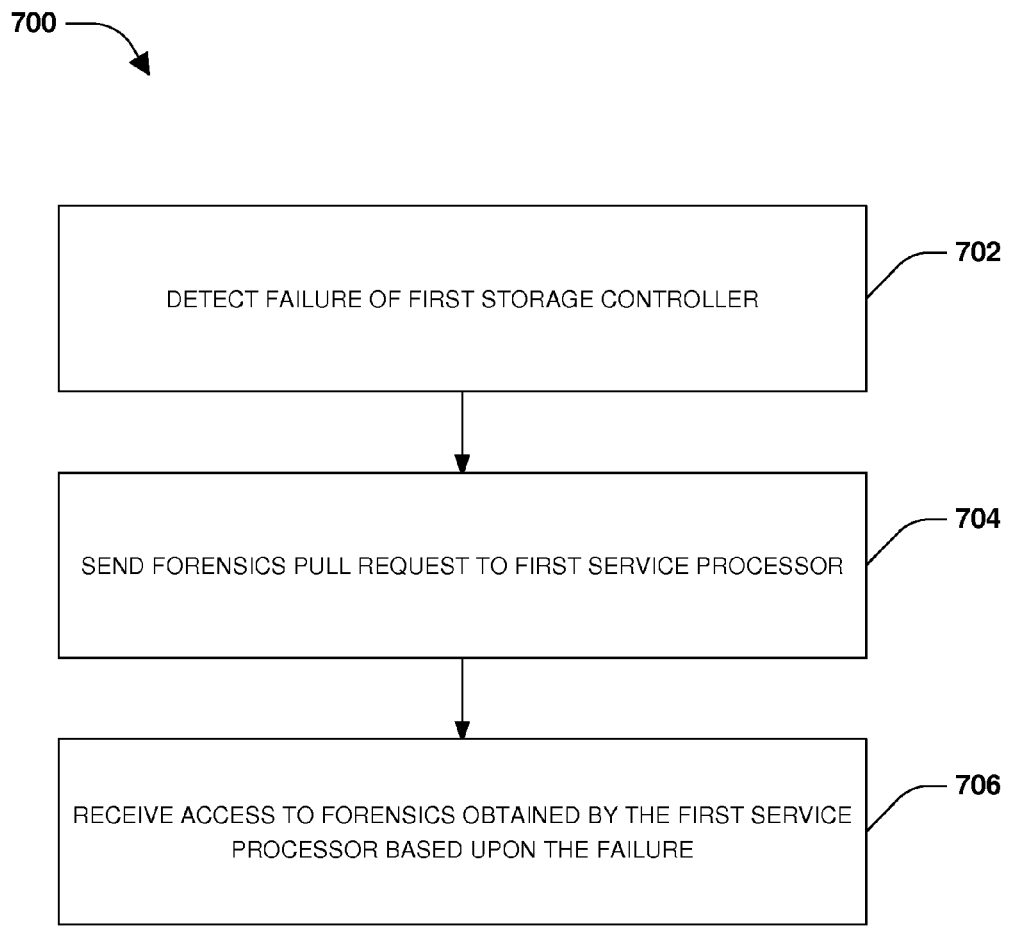
FIG. 7 is a flow chart illustrating an exemplary method of collecting forensics associated with a failure of a storage controller.

One embodiment of collecting forensics associated with a failure of a storage controller is illustrated by an exemplary method 700 of FIG. 7. At 702, a failure of a first storage controller may be detected. The first storage controller may be comprised within a first storage node of the cluster environment. The first storage controller may be configured to manage a storage device accessible to one or more client devices. In an example, a local storage node may remotely detect the failure of the first storage controller at the first storage node. At 704, a forensics pull request may be sent to a first service processor comprised within the first storage node (e.g., the local storage node may send the forensics pull request). At 706, access to forensics for the failure (e.g., forensics obtained by the first service processor in response to the first forensics pull request) may be received.

A failure of a second storage controller may be detected. The second storage controller may be comprised within a second storage node of the cluster environment. The second storage controller may be configured to manage a second storage device accessible to one or more client devices. In an example, the local storage node may remotely detect the second failure of the second storage controller at the second storage node. A second forensics pull request may be sent to a second service processor comprised within the second storage node (e.g., the local storage node may send the second forensics pull request). Access to second forensics for the second failure (e.g., forensics obtained by the second service processor in response to the second forensics pull request) may be received. In this way, forensics about storage controller failures may be remotely obtained during such failures.

Figure 8:
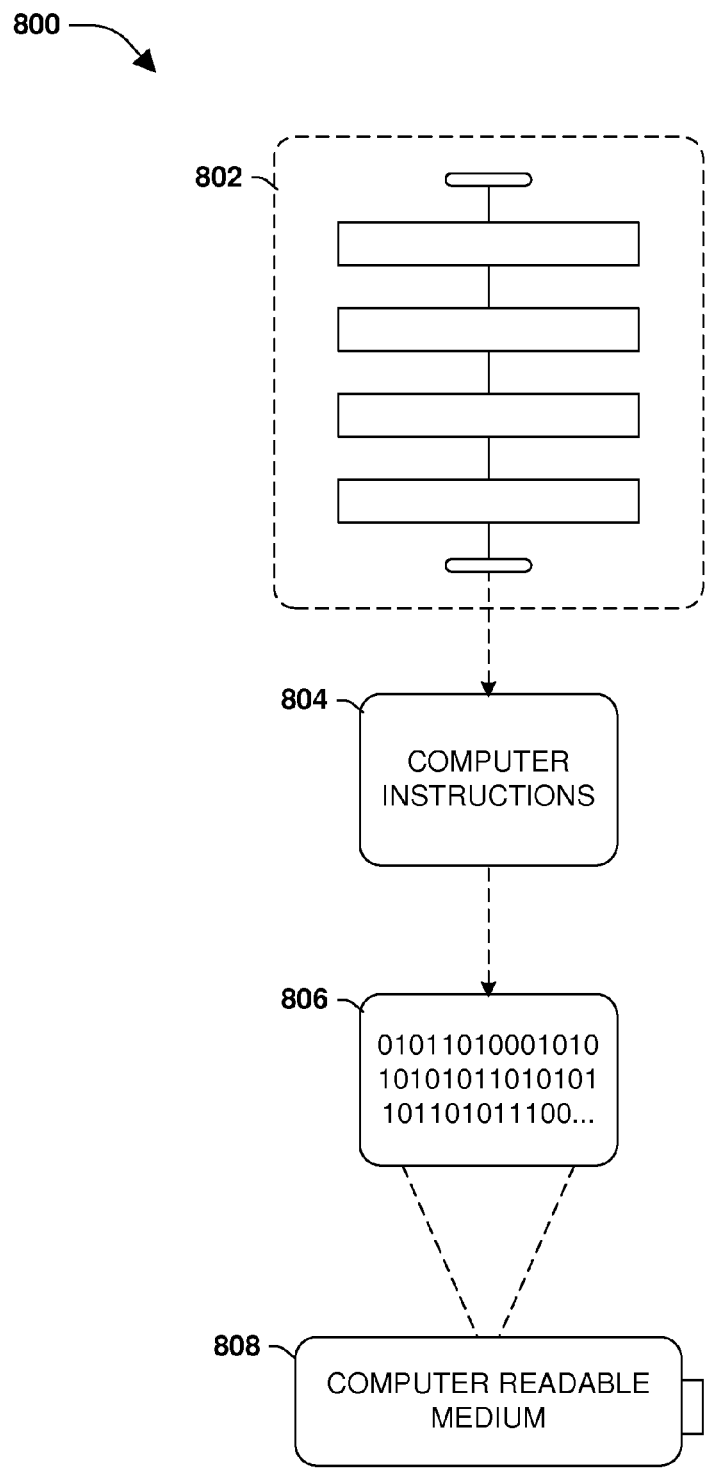
FIG. 8 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 8, wherein the implementation 800 comprises a computer-readable medium 808, such as a CD-ft DVD-R, flash drive, a platter of a hard disk drive, etc., on which is encoded computer-readable data 806. This computer-readable data 806, such as binary data comprising at least one of a zero or a one, in turn comprises a set of computer instructions 804 configured to operate according to one or more of the principles set forth herein. In some embodiments, the processor-executable computer instructions 804 are configured to perform a method 802, such as at least some of the exemplary method 700 of FIG. 7, for example. In some embodiments, the processor-executable instructions 804 are configured to implement a system, such as at least some of the exemplary system 400 of FIG. 4, at least some of the exemplary system 500 of FIGS. 5A-5C, and/or at least some of the exemplary system 600 of FIG. 6, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computing device, comprising:
    a hardware service processor installed in a first node of a cluster environment of a plurality of nodes, the hardware service processor comprising:
       first communication connectivity to the cluster environment that is separate from second communication connectivity of a first storage controller of the first node, wherein the first communication connectivity is a first dedicated connection between the hardware service processor and a client switch, wherein the second communication connectivity is a second dedicated connection between the first storage controller and a storage network;
    a processor; and
    a memory containing instructions, which when executed by the processor, cause the processor to:
       detect a failure of the first storage controller;
       obtain forensics associated with the failure; and
       transmit, during the failure, the forensics to a cluster health monitor using the first dedicated connection of the hardware service processor.

2. The computing device of claim 1, wherein the instructions cause the processor to:
    receive a forensics pull request from the cluster health monitor; and
    provide the cluster health monitor with access to the forensics.

3. The computing device of claim 1, wherein the instructions cause the processor to:
    push the forensics to the cluster health monitor based upon a push policy.

4. The computing device of claim 1, the first storage node configured to:
    detect a second failure of a second storage controller comprised within a second node of the cluster environment;
    send a forensics acquisition request to a second hardware service processor comprised within the second node; and
    receive second forensics, associated with the second failure, from the second hardware service processor.

5. The computing device of claim 1, the cluster environment comprising a client network connecting the plurality of nodes one or more client devices, the cluster environment comprising a non-client storage management network as the storage network connecting the plurality of nodes together, the hardware service processor connected to the non-client storage management network by a first network interface controller of the first node.

6. The computing device of claim 1, the cluster environment comprising a client network connecting the plurality of nodes to one or more client devices, the cluster environment comprising a non-client storage management network as the storage network connecting the plurality of nodes together, the hardware service processor connected to the non-client storage management network through a first non-client storage management switch connected to a second non-client storage management switch of the non-client storage management network.

7. The computing device of claim 1, the cluster environment comprising a client network connecting the plurality of nodes to one or more client devices, the cluster environment comprising a non-client storage management network as the storage network connecting the plurality of nodes together, the hardware service processor connected to the non-client storage management network.

8. The computing device of claim 1, the cluster environment comprising a client network connecting the plurality of nodes to one or more client devices, the cluster environment comprising a non-client storage management network as the storage network connecting the plurality of nodes together, the hardware service processor connected to the client network by the first communication connectivity.

9. The computing device of claim 1, the hardware service processor configured to:
receive a recommendation from the cluster health monitor, the recommendation comprising an update instruction to implement upon the first storage controller.

10. The computing device of claim 1, the forensics comprising a service processor induced dump.

11. The computing device of claim 1, the hardware service processor configured to:
receive a cluster update push instruction from a cluster update component, the cluster update push instruction comprising a configuration update; and
implement the cluster update push instruction for the first storage controller.

12. The computing device of claim 1, the hardware service processor configured to:
send a cluster update pull request to a cluster update component;
receive a cluster update response from the cluster update component, the cluster update response comprising a software update; and
implement the cluster update response for the first storage controller.

13. The computing device of claim 1, the hardware service processor having a one-to-one relationship with the first storage controller.

14. The computing device of claim 1, the hardware service processor comprising a chassis manager having a first relationship with the first storage controller and a second relationship with a second storage controller.

15. The computing device of claim 4, the first storage controller and the second storage controller configured according to a node pairing where the first storage controller is configured as a primary storage controller that provides the one or more client devices with access to the storage device and the second storage controller is configured as a secondary storage controller configured to provide failover operation when the first storage controller fails.

16. A non-transitory machine readable medium comprising instructions for performing a method, which when executed by a machine, cause the machine to:
detect, by a hardware service processor installed in a node comprising a storage controller, a failure of the storage controller, wherein the hardware service processor comprises first communication connectivity to a cluster environment that is separate from second communication connectivity of the storage controller of the node, wherein the first communication connectivity is a first dedicated connection between the hardware service processor and a client switch, wherein the second communication connectivity is a second dedicated connection between the storage controller and a storage network;
obtain forensics associated with the failure; and
transmit, during the failure, the forensics to a cluster health monitor using the first dedicated connection of the hardware service processor.

17. The non-transitory machine readable medium of claim 16, wherein the instructions cause the machine to:
detect a second failure of a second storage controller comprised within a second node of the cluster environment;
send a forensics acquisition request to a second hardware service processor comprised within the second node; and
receive second forensics, associated with the second failure, from the second hardware service processor.

18. The non-transitory machine readable medium of claim 16, the hardware service processor configured to:
receive a cluster update push instruction from a cluster update component, the cluster update push instruction comprising an issue detection instruction; and
implement the cluster update push instruction for the storage controller.

19. A method, comprising:
detecting, by a hardware service processor installed in a node comprising a storage controller, a failure of the storage controller, wherein the hardware service processor comprises first communication connectivity to a cluster environment that is separate from second communication connectivity of the storage controller of the node, wherein the first communication connectivity is a first dedicated connection between the hardware service processor and a client switch, wherein the second communication connectivity is a second dedicated connection between the storage controller and a storage network;
obtaining forensics associated with the failure; and
transmitting, during the failure, the forensics to a cluster health monitor using the first dedicated connection of the hardware service processor.

20. The method of claim 19, comprising:
detecting a second failure of a second storage controller comprised within a second node of the cluster environment, the second storage controller configured to manage a second storage device accessible to one or more client devices;
sending a second forensics pull request to a second hardware service processor comprised within the second storage node; and
receiving access to second forensics obtained by the second hardware service processor based upon the second failure.

* * * * *